3,786,091
PHOSPHORIC ACID SALTS OF LONG CHAIN AMINO COMPOUNDS

Friedrich Bolsing, Lindhorst, Germany (% Knapsack Aktiengesellschaft, Knapsack, Germany)
No Drawing. Continuation-in-part of abandoned application Ser. No. 44,900, June 9, 1970. This application Dec. 15, 1971, Ser. No. 208,395
Claims priority, application Germany, June 23, 1969, P 19 31 768.1
Int. Cl. C07c 87/04
U.S. Cl. 260—583 R          2 Claims

ABSTRACT OF THE DISCLOSURE

Production of a phosphoric acid-containing paste base. The paste base is produced by preparing a finely divided aqueous dispersion of a long-chain amine, preheating the dispersion, introducing preheated phosphoric acid thereinto, with vigorous agitation, at elevated temperature and until neutral, and stirring the resulting mixture until cold.

---

The present application is a continuation-in-part application Ser. No. 44,900 filed June 9, 1970, now abandoned and relates to a paste base containing phosphoric acid, to a process for its manufacture, and to its uses.

For a plurality of uses including, for example, the transport or storage and more particularly the application of phosphoric acid for surface treatment or metal cleaning, it is highly desirable for the acid to have a pasty consistency rather than the liquid consistency of an orthodox acid bath normally employed for such treatment. Pasty phosphoric acid, for example, does not run off from a metal surface to be freed from rust, but remains in contact with the layer of rust thereon over a period of time sufficient to effect dissolution thereof.

It is generally known that aqueous and non-aqueous liquid systems can be made into pastes by the addition, with agitation or kneading, of inorganic or organic fillers, which are added in the proportions necessary to produce a paste of a given consistency. The quantity of filler to be added in each particular case is a function of its nature. The concentration of an aqueous acid can be effected by the addition of considerably smaller proportions of filler if finely dispersed silicic acid is substituted for coarser kieselguhr, for example.

It has also been reported earlier that liquid systems can be transformed into pastes by emulsification. In this case, less organic filler is required to be used than in solid dispersions. Thus, it is possible to emulsify, for example, fatty acids with the use of an emulsifier, which preferably is an ammonium salt of these acids, in water so as to obtain a paste. As has been expected, it is possible to replace the fatty acids by further compounds having long hydrocarbon chains. In this event, however, the emulsifier cannot be produced from the paste base itself. It is required to be added separately, for example, to paraffin oil or fatty alcohols. This method of making pastes has long been used in widespread applications, for example in the foodstuff chemistry and cosmetics.

It is also possible in this way to transform an aqueous acid into a paste. German Pat. 1,082,475, for example, describes the preparation of pasty rust removers containing phosphoric acid in combination with (1) a thickener, for example, a saponifiable oil or a fatty acid convertible to a soap, (2) a surface-active emulsifier, for example, a tertiary amine having a fatty alkyl group or two polyoxyethylene chains attached to the nitrogen atom, or (3) fatty acid amides having two polyoxyethylene chains linked to the nitrogen atom.

To this effect, it is necessary to produce in two separate vessels firstly a mixture of phosphoric acid of 75% strength, for example, and water, and secondly a mixture of the amine and stearic acid. Following this, the two mixtures are heated to 60° C. and the mixture produced in the second vessel is poured into that produced in the first vessel with the resultant formation of a fluid creamy composition which gives a smooth paste on standing overnight.

Rust remover pastes which are based on emulsions are, however, not fully satisfactory bearing in mind that the paste base includes chemical compounds combining the failure to participate in the removal of dust with the failure to afford a permanent protection against rust. It is therefore necessary to further add a corrosion inhibitor. In other words, a rust remover paste of the type described above should conveniently comprise a paste base, an aqueous acid and a corrosion inhibitor. A further deficiency of the emulsions resides in the fact that they tend to dry up, whereby their structure is destroyed. This effects the formation of cloddy material and naturally an irregular action of the rust remover acid.

British Pat. 1,010,713 describes a process for making lubricants, wherein lauryl amine, a fatty amine other than lauryl amine or a polyamine is partially neutralized by means of concentrated chromic or phosphoric acid with the resultant formation of a paste which is miscible with mineral oils and can be made into an anticorrosive emulsion, with the use of water. These pastes contain a considerable excess of free amines and accordingly produce an alkaline reaction. This is the reason why they cannot be used, for example, for cleansing metal surfaces, nor can they be used as rust removers.

These conventional pastes are produced predominantly by kneading the amines together with water-soluble chromic acid and are thereby given the necessary consistency. The reaction product which does form in the excess amine is the filler used for thickening the amine. It is an object of the present invention to provide a paste base which itself acts as a corrosion inhibitor so that merely two components, namely an aqueous acid and a corrosion inhibitor, are needed to produce a rust remover paste, for example.

It is another object of the present invention to provide a paste base which per se is neutral but can be rendered acid or basic conditional upon the use the paste base is put to.

The phosphoric acid-containing paste base of the present invention contains as its essential ingredients:

(A) between 10 and 90 weight percent of water;
(B) between 2 and 90 weight percent of at least one amine selected from the group comprising primary, secondary and tertiary alkyl and alkylene amines with one or more amine functions, the said amines being derivatives of substituted or unsubstituted hydrocarbon compounds having from 8 to 24 carbon atoms;
(C) between 0 and 80 weight percent of an organic solvent immiscible with water or of a mixture of said solvents;
(D) between 0 and 30 weight percent, calculated on the amounts of the water and the said organic solvent(s), of an emulsifier or a mixture of emulsifiers; and
(E) phosphoric acid with a concentration from 5 to 100 percent by weight in an amount sufficient to neutralize the said amine or mixture of amines.

As the amine the paste base contains for example coconut oil amine, tallow fatty amine, oleyl amine, octyl amine, decyl amine, dodecyl amine, tetradecyl amine, hexadecyl amine, octadecyl amine, eicosyl amine, docosyl amine, methylstearyl amine, distearyl amine, dimethylstearyl amine, dimethylcoconut oil amine, dimethyldodecyl amine, dimethyltetradecyl amine, dimethylhexadecyl amine, and methyldistearyl amine, or a mixture of the said amines.

As a preferred organic solvent the paste base contains petroleum, paraffin oil, petroleum ether, benzine, ligroine, mineral oils, fatty oils, chlorinated hydrocarbons e.g. chloroform and methylene chloride, and aromatic compounds, such as benzene, toluene and xylene. As a preferred emulsifier the paste base contains alkali metal or ammonium salts or amines and esters of fatty acids or sulfonated fatty acids of high molecular weight, fatty alcohol sulfonates, quaternary ammonium compounds, sulfonated amines or phosphoric acid esters.

The paste paste base of the present invention may additionally contain additives for example amines other than the said long-chain amines, organic acids, such as oxalic acid, tartaric acid, inorganic acids, e.g. sulfuric acid hydrochloric acid, hydrofluoric acid, nitric acid, abrasives, such as quartz powder or polishing alumina; auxiliaries, such as thiourea and ammonium chloride or further additions known to be special metal cleaning and polishing agents and corrosion inhibitors such as waxes, wax acids, silicon oil or similar materials.

The paste base of the present invention is unexpectedly obtained by preparing a finely divided dispersion consisting of:

(A) from 10 to 90 weight percent of water,
(B) from 2 to 90 weight percent of at least one amine selected from the group consisting of primary, secondary and tertiary alkyl and alkylene amines with one or more amine functions, the said amines being derivatives of substituted or unsubstituted hydrocarbon compounds having from 8 to 24 carbon atoms,
(C) from 0 to 80 weight percent of an organic solvent or solvent mixture immiscible with water and
(D) from 0 to 30 weight percent, calculated on the amounts of the water and the organic solvent of an emulsifier or a mixture of emulsifiers, heating the dispersion obtained to a temperature of between 40 and 100° C., vigorously agitating the heated dispersion and simultaneously introducing thereinto phosphoric acid with a concentration from 5 to 100 percent by weight and preheated to a temperature between 40 and 120° C. until neutralization of the amine, and stirring the resulting reaction mixture until its temperature has dropped down to a value of between 5 and 25° C.

Beneficial effects of the paste base so produced reside more particularly in the fact that it is free from special thickeners or fillers and that a great variety of substances can be incorporated into it, conditional upon the use it is put to.

To improve the dispersion, the amine may first be used in the form of an aqueous emulsion which may be combined with conventional emulsifiers, for example the emulsifiers based on organic phosphoric acid esters. The emulsion may be used in further combination with the organic solvents immiscible with water, specified above. The emulsifiers should preferably be used in a proportion of between 5 and 10 weight percent, based on the amine, and—provided that an organic solvent is used—in the customary proportions of between 5 and 10 weight percent, based on the solvent.

The said dispersion as well as the phosphoric acid should preferably be maintained at temperatures of about 80° C. until the neutral point has been reached. Following this, the reaction mixture is stirred until cold. The step of cooling the mixture from reaction temperature down to room temperature should be effected fairly rapidly.

The aqueous phosphoric acid may be used in a preferred concentration of between 30 and 60 weight percent. It is possible additionally to add additives to the paste base at the reaction temperature or lower temperatures, with agitation and conditional upon the use the paste base is put to. These additives include those which are mentioned above.

The paste base produced in accordance with the present invention can be used singly or in combination with further components, for example for the treatment of metal surfaces, more particularly as a metal cleaning agent or rust remover or, for example, for the treatment of concrete surfaces.

The products obtained by the process of the present invention distinguish favorably in various respects over those obtained by conventional methods. They have a high concentration of active substance therein bearing in mind that the paste base contains the components necessary to effect metal cleaning and metal protection, but is otherwise free from alien components. While, following their application to surfaces, they are easy to remove therefrom, for example by means of a water wash, if necessary or convenient, the fact remains that they leave an extremely permanent hydrophobic protective film on the clean metal surface. Depending on the contemplated uses, they may be rendered acid, neutral or basic.

The following examples illustrate the invention without limiting it thereto:

EXAMPLE 1

4 grams stearyl amine and 48 grams water were heated to 80° C. in a water bath and stirred into a smooth mass by means of a rapid stirrer. Following this, phosphoric acid having a strength of 85 weight percent and preheated to about 80° C. was slowly added (parts by weight) until the neutral point was found to have been reached. A very solid paste base was obtained which permitted the incorporation of further components thereinto (cf. Example 2).

EXAMPLE 2

The procedure was the same as that described in Example 1. Once the neutral point was found to have been reached, a further quantity of phosphoric acid having a temperature of about 20° C. was added, i.e. a quantity corresponding approximately to that of the added water. A soft paste with a high concentration of phosphoric acid therein was obtained. It was used as a rust remover, for example.

EXAMPLE 3

The pastes were produced in the manner described in Example 1 save that the stearylamine was replaced by oleyl amine, coconut oil amine or tallow fatty amine.

EXAMPLE 4

20 grams stearyl amine and 2 grams emulsifier based on an organic phosphoric acid ester were heated to 80° C. and 100 grams water preheated to 80° C. were slowly stirred thereinto. The resulting mixture was stirred until smooth and phoshporic acid with a strength of 75 weight percent was incorporated in the manner described in Example 1.

EXAMPLE 5

The amine/emulsifier-mixture of Example 4 was combined with up to 75 grams petroleum, which was added prior to the water. The resulting paste was found to more deeply penetrate into a layer of rust.

EXAMPLE 6

The mixture of Examples 1 to 5 inclusive were further combined—once the neutral point had been reached or later—with up to 30 weight percent of an abrasive, based on the paste base. The resulting pastes were used as metal polish agents which were capable of removing rust. As compared with conventional pastes, they were found to combine mechanical cleaning effects with the chemical removal of rust.

EXAMPLE 7

The procedure was the same as that described in Example 1. Once the neutral point was found to have been reached, the paste base was further combined with a slightly acid solution of 8 grams thiourea in 50 grams water. Still further, the paste base was combined with polishing agents, waxes and solvents, and an efficient silver polish agent having a corrosion-inhibiting paste base therein was obtained. The substitution of ammonium chloride for thiourea resulted in the formation of a copper polish agent having a corrosion-inhibiting paste base therein.

EXAMPLE 8

A neutral metal polish was prepared. To this effect, it was necessary to first react in the manner described in Example 5, 3 grams stearyl amine, 4 grams emulsifier, 50 grams water and 20 grams petroleum with 1.3 gram phosphoric acid having a strength of 85 weight percent. Following this, the reaction product was further combined with 4 grams of a wax acid, 20 grams polishing alumina, 20 grams abrasive and 5 grams silicon oil.

What I claim is:

1. A phosphoric acid composition produced by preparing a finely divided dispersion consisting of from 10 to 90 weight percent of water, from 2 to 90 weight percent of at least one amine selected from the group consisting of primary, secondary and tertiary alkyl and alkylene amines with one or more amine functions, the said amines being derivatives of substituted or unsubstituted hydrocarbon compounds having from 8 to 24 carbon atoms, from 0 to 80 weight percent of at least one organic solvent immiscible with water, selected from the group consisting of petroleum, paraffin oil, petroleum ether, benzine, ligroine, mineral oils, fatty oils, chlorinated hydrocarbons, benzene, toluene and xylene, from 0 to 30 weight percent, based on the amounts of the water and the organic solvent, of at least one emulsifier selected from the group consisting of alkali metal and ammonium salts, amines and esters of fatty acids or sulfonated fatty acids of high molecular weight, fatty alcohol sulfonates, quaternary ammonium compounds, sulfonated amines and phosphoric acid esters, heating the dispersion obtained to a temperature between 40 and 100° C., vigorously agitating the heated dispersion and simultaneously introducing thereinto phosphoric acid with a concentration from 5 to 100 percent by weight and preheated to a temperature between 40 and 120° C. until neutralization of the amine, and stirring the resulting reaction mixture until its temperature has dropped down to a value between 5 and 25° C., with the resultant formation of a pasty reaction product being suitable as a paste base.

2. A paste base as claimed in claim 1, containing as the amine at least one substance selected from the group consisting of coconut oil amine, tallow fatty amine, oleyl amine, octyl amine, decyl amine, dodecyl amine, tetradecyl amine, hexadecyl amine, octadecyl amine, eicosyl amine, docosyl amine, methylstearyl amine, distearyl amine, dimethylstearyl amine, dimethylcoconut oil amine, dimethyldodecyl amine, dimethyltetradecyl amine, dimethylhexadecyl amine, and methyldistearyl amine.

References Cited

UNITED STATES PATENTS

| 2,336,448 | 12/1943 | Cox | 260—583 R |
| 3,367,749 | 2/1968 | Koerner et al. | 260—583 R |
| 3,428,713 | 2/1969 | Bartlett et al. | 260—583 R |

FOREIGN PATENTS

| 895,091 | 5/1962 | Great Britain | 260—583 |
| 1,010,713 | 11/1961 | Great Britain | 260—583 |

LEWIS GOTTS, Primary Examiner

D. R. PHILLIPS, Assistant Examiner

U.S. Cl. X.R.

252—86, 87, 136, 143, 146, 525